United States Patent
Ryu et al.

(10) Patent No.: US 11,248,090 B2
(45) Date of Patent: Feb. 15, 2022

(54) POLY(AMIDE-IMIDE) COPOLYMER COMPOSITION AND COLORLESS AND TRANSPARENT POLY(AMIDE-IMIDE) FILM COMPRISING THE SAME

(71) Applicant: LG CHEM, LTD., Seoul (KR)

(72) Inventors: Bi Oh Ryu, Daejeon (KR); Soon Yong Park, Daejeon (KR); Young Ji Tae, Daejeon (KR); Young Seok Park, Daejeon (KR); Kwan Yeol Paek, Daejeon (KR); Il Hwan Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/488,064

(22) PCT Filed: Apr. 10, 2018

(86) PCT No.: PCT/KR2018/004207
§ 371 (c)(1),
(2) Date: Aug. 22, 2019

(87) PCT Pub. No.: WO2018/221851
PCT Pub. Date: Dec. 6, 2018

(65) Prior Publication Data
US 2020/0024401 A1 Jan. 23, 2020

(30) Foreign Application Priority Data

May 30, 2017 (KR) .................. 10-2017-0066835
Apr. 9, 2018 (KR) .................. 10-2018-0041030

(51) Int. Cl.
*C08G 73/14* (2006.01)
*C08K 5/3475* (2006.01)
*C08J 5/18* (2006.01)

(52) U.S. Cl.
CPC .............. *C08G 73/14* (2013.01); *C08J 5/18* (2013.01); *C08K 5/3475* (2013.01); *C08J 2379/08* (2013.01)

(58) Field of Classification Search
CPC ......... C08G 73/14; C08J 5/18; C08J 2379/08; C08K 5/3475
See application file for complete search history.

(56) References Cited

U.S. PATENT DOCUMENTS

| | | |
|---|---|---|
| 6,867,250 B1 | 3/2005 | Gupta et al. |
| 8,206,818 B2 | 6/2012 | Bekele et al. |
| 2006/0194903 A1 | 8/2006 | Sour et al. |
| 2010/0018756 A1 | 1/2010 | Shimeno et al. |
| 2010/0063239 A1 | 3/2010 | Inoue et al. |
| 2012/0296050 A1 | 11/2012 | Cho et al. |
| 2016/0039977 A1* | 2/2016 | Cho ................ C09D 179/08 525/432 |
| 2016/0152773 A1 | 6/2016 | Murakami et al. |
| 2016/0319076 A1 | 11/2016 | Ju et al. |
| 2018/0208766 A1* | 7/2018 | Nakayama ......... C08G 73/1042 |
| 2019/0153161 A1 | 5/2019 | Ryu et al. |

FOREIGN PATENT DOCUMENTS

| | | |
|---|---|---|
| CN | 101501093 A | 8/2009 |
| CN | 105899581 A | 8/2016 |
| EP | 2058347 A1 | 5/2009 |
| JP | S59-204518 A | 11/1984 |
| JP | 07-041559 A | 2/1995 |
| JP | H07-165915 A | 6/1995 |
| JP | 2005-146133 A | 6/2005 |
| JP | 2008-074991 A | 4/2008 |
| JP | 2008-169363 A | 7/2008 |
| JP | 2010-150552 A | 7/2010 |
| JP | 2010-202714 A | 9/2010 |
| JP | 2013-043975 A | 3/2013 |
| JP | 5273545 B | 8/2013 |
| JP | 5309896 B2 | 10/2013 |
| JP | 2017-503887 A | 2/2017 |
| JP | 2019-515993 A | 6/2019 |
| KR | 10-2005-0106488 A | 11/2005 |
| KR | 10-2009-0033498 A | 4/2009 |
| KR | 10-2013-0029129 A | 3/2013 |
| KR | 10-2016-0034252 A | 3/2016 |
| WO | 2017-010566 A1 | 1/2017 |

OTHER PUBLICATIONS

International Search Report and Written Opinion issued for international application No. PCT/KR2018/004207 dated Jan. 11, 2019, 11 pages.

\* cited by examiner

*Primary Examiner* — Bijan Ahvazi
(74) *Attorney, Agent, or Firm* — Rothwell, Figg, Ernst & Manbeck, P.C

(57) ABSTRACT

A poly(amide-imide) copolymer composition comprising an imide of a polyamic acid and an ultraviolet stabilizer, and a colorless and transparent poly(amide-imide) film including the composition. The poly(amide-imide) copolymer composition according to the present disclosure makes it possible to provide a poly(amide-imide) film exhibiting excellent scratch resistance, UV shielding property, and UV weather resistance while being colorless and transparent. This film can be suitably used as a cover film of various flexible or foldable devices.

13 Claims, No Drawings

POLY(AMIDE-IMIDE) COPOLYMER COMPOSITION AND COLORLESS AND TRANSPARENT POLY(AMIDE-IMIDE) FILM COMPRISING THE SAME

CROSS-REFERENCE TO RELATED APPLICATION

This application is a 35 U.S.C. § 371 National Phase Entry Application from PCT/KR2018/004207, filed on Apr. 10, 2018, and designating the United States, which claims the benefit of Korean Patent Application Nos. 10-2017-0066835 filed on May 30, 2017 and 10-2018-0041030 filed on Apr. 9, 2018 with the Korean Intellectual Property Office, the disclosures of which are incorporated herein by reference in their entirety.

TECHNICAL FIELD

The present disclosure relates to a poly(amide-imide) copolymer composition and a colorless and transparent poly(amide-imide) film including the same.

BACKGROUND OF ART

An aromatic polyimide resin is a polymer mostly having an amorphous structure, and exhibits excellent heat resistance, chemical resistance, electrical properties, and dimensional stability due to its rigid chain structure. The polyimide resin is widely used as an electrical/electronic material.

However, the polyimide resin has many limitations in use, because it is dark brown due to the formation of a CTC (charge transfer complex) of $\pi$ electrons present in the imide chain.

In order to solve the limitations and obtain a colorless transparent polyimide resin, a method of restricting the movement of the $\pi$ electrons by introducing a strong electron attracting group such as a trifluoromethyl ($-CF_3$) group, a method of reducing the formation of the CTC by introducing a sulfone ($-SO_2-$) group, an ether ($-O-$) group, or the like into the main chain to make a bent structure, or a method of inhibiting the formation of the resonance structure of the $\pi$ electrons by introducing an aliphatic cyclic compound, has been proposed.

However, it is difficult for the polyimide resin according to the proposals to exhibit sufficient heat resistance due to the bending structure or the aliphatic cyclic compound, and a film prepared using the same still has limitations such as poor mechanical properties.

On the other hand, in recent years, poly(amide-imide) copolymers having a polyamide unit structure to improve the scratch resistance of polyimide have been developed.

However, the poly(amide-imide) copolymer tends to easily produce haze when a film is formed by coating the same due to its high crystallinity.

Such a haze characteristic of the poly(amide-imide) film is severely manifested and affects the yellow index (YI) as the thickness of the film is thicker, so a method for improving them is required.

DETAILED DESCRIPTION OF THE INVENTION

Technical Problem

The present disclosure is to provide a poly(amide-imide) copolymer composition exhibiting excellent scratch resistance, UV shielding property, and UV weather resistance while being colorless and transparent.

In addition, the present disclosure is to provide a colorless and transparent poly(amide-imide) film including the poly (amide-imide) copolymer composition.

Technical Solution

The present disclosure provides a poly(amide-imide) copolymer composition, including an imide of a polyamic acid resulting from copolymerizing an aromatic diamine monomer, an aromatic dianhydride monomer and an aromatic dicarbonyl monomer, and an ultraviolet stabilizer, wherein the aromatic dicarbonyl monomer is contained in an amount of at least 50 mol % based on the total moles of the aromatic dianhydride monomer and the aromatic dicarbonyl monomer, and the aromatic dicarbonyl monomer consists of 0 to 35 mol % of 4,4'-biphenyldicarbonyl chloride, 5 to 40 mol % of isophthaloyl chloride, and 60 to 95 mol % of terephthaloyl chloride.

In addition, the present disclosure provides a poly(amide-imide) film including the poly(amide-imide) copolymer composition.

Hereinafter, the poly(amide-imide) copolymer composition and the poly(amide-imide) film according to the exemplary embodiments of the present disclosure will be described in more detail.

In this specification, terms are used merely to refer to specific embodiments, and are not intended to restrict the present disclosure unless this is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. Poly(amide-imide) Polymer Composition

One embodiment of the present disclosure provides a poly(amide-imide) copolymer composition, including an imide of a polyamic acid resulting from copolymerizing an aromatic diamine monomer, an aromatic dianhydride monomer and an aromatic dicarbonyl monomer, and an ultraviolet stabilizer, wherein the aromatic dicarbonyl monomer is contained in an amount of at least 50 mol % based on the total moles of the aromatic dianhydride monomer and the aromatic dicarbonyl monomer, and the aromatic dicarbonyl monomer consists of 0 to 35 mol % of 4,4'-biphenyldicarbonyl chloride, 5 to 40 mol % of isophthaloyl chloride, and 60 to 95 mol % of terephthaloyl chloride.

As a result of studies by the present inventors, it was confirmed that a copolymer having excellent scratch resistance while being colorless and transparent can be formed when aromatic dicarbonyl monomers having a specific composition are used to form a poly(amide-imide) copolymer using an aromatic diamine monomer, an aromatic dianhydride monomer, and an aromatic dicarbonyl monomer. That is, the aromatic dicarbonyl monomer of the specified composition according to the embodiment of the present disclosure can minimize crystallization during copolymerization with aromatic diamine monomers and aromatic dianhydride monomers, enabling the formation of a poly(amide-imide) copolymer exhibiting excellent scratch resistance together with low haze.

In addition, it was confirmed that the composition including the poly(amide-imide) copolymer satisfying the above characteristics and a UV stabilizer can exhibit an excellent UV shielding property and improved UV weather resistance.

According to the embodiment of the present disclosure, the poly(amide-imide) copolymer is an imide of a polyamic acid resulting from copolymerizing an aromatic diamine monomer, an aromatic dianhydride monomer, and an aromatic dicarbonyl monomer.

The polyamic acid may be a block copolymer or a random copolymer.

For example, the polyamic acid block copolymer may have a first unit structure derived from copolymerization of the aromatic diamine monomer and the aromatic dianhydride monomer, and a second unit structure derived from copolymerization of the aromatic diamine monomer and the aromatic dicarbonyl monomer.

In the polyamic acid random copolymer, the poly(amide-imide) copolymer may have a unit structure in which the aromatic diamine monomer, the aromatic dianhydride monomer, and the aromatic dicarbonyl monomer each form an amide bond and are randomly copolymerized.

This polyamic acid forms a poly(amide-imide) copolymer simultaneously having an imide bond by imidization and an amide bond.

According to an embodiment of the present disclosure, the aromatic dicarbonyl monomer is preferably contained in an amount of at least 50 mol % based on the total moles of the aromatic dianhydride monomer and the aromatic dicarbonyl monomer, in order to form a copolymer exhibiting excellent scratch resistance while being colorless and transparent.

Preferably, the aromatic dicarbonyl monomer may be contained in an amount of 50 mol % or more, 60 mol % or more, 70 mol % or more, or 75 mol % or more based on the total moles of the aromatic dianhydride monomer and the aromatic dicarbonyl monomer.

However, when the aromatic dicarbonyl monomer is used in an excess amount, problems such as lowered moisture absorbency or opacity may occur. Therefore, it is preferable that the aromatic dicarbonyl monomer is contained in an amount of 99 mol % or less, 97 mol % or less, 90 mol % or less, 85 mol % or less, or 80 mol % or less based on the total moles of the aromatic dianhydride monomer and the aromatic dicarbonyl monomer.

In particular, according to an embodiment of the present disclosure, it is preferable that the aromatic dicarbonyl monomer includes isophthaloyl chloride and terephthaloyl chloride together.

The isophthaloyl chloride and terephthaloyl chloride are compounds in which two carbonyl groups are bonded at the meta or para position with respect to the central phenylene group. Therefore, it is possible to exhibit an advantageous effect for improving the processability due to the meta bond in the copolymer and for improving the mechanical properties due to the para bond, by applying isophthaloyl chloride together with terephthaloyl chloride as the aromatic dicarbonyl monomer to form a poly(amide-imide) copolymer.

In addition, the aromatic dicarbonyl monomer may further include 4,4'-biphenyldicarbonyl chloride together with the isophthaloyl chloride and terephthaloyl chloride.

Specifically, according to the embodiment of the present disclosure, it is preferable that the aromatic dicarbonyl monomer consists of 0 to 35 mol % of 4,4'-biphenyldicarbonyl chloride, 5 to 40 mol % of isophthaloyl chloride, and 60 to 95 mol % of terephthaloyl chloride.

That is, the isophthaloyl chloride and terephthaloyl chloride included in the aromatic dicarbonyl monomer can improve processability and mechanical properties of the copolymer within the above-mentioned molar ratio, and at the same time, can manifest high hardness and low haze.

Preferably, the isophthaloyl chloride is contained in an amount of 5 mol % or more, 10 mol % or more, or 12 mol % or more, and 40 mol % or less, 35 mol % or less, or 30 mol % or less, based on the total moles of the aromatic dicarbonyl monomer.

Preferably, the terephthaloyl chloride is contained in an amount of 95 mol % or less, 90 mol % or less, or 88 mol % or less, and 60 mol % or more, 65 mol % or more, or 70 mol % or more, based on the total moles of the aromatic dicarbonyl monomer.

If necessary, the 4,4'-biphenyldicarbonyl chloride may be contained in an amount of 35 mol % or less, 30 mol % or less, 25 mol % or less, or 20 mol % or less, and 1 mol % or more, or 5 mol % or more, based on the total moles of the aromatic dicarbonyl monomer.

As described above, the poly(amide-imide) copolymer according to the embodiment of the present disclosure may exhibit excellent scratch resistance (high grade pencil hardness) and a colorless transparent characteristic (low haze and yellow index), only when the composition of the aromatic dicarbonyl monomer satisfies both of the following two conditions.

(i) The aromatic dicarbonyl monomer should be contained in an amount of at least 50 mol % based on the total moles of the aromatic dianhydride monomer and the aromatic dicarbonyl monomer.

(ii) The aromatic dicarbonyl monomer should consist of 0 to 35 mol % of 4,4'-biphenyldicarbonyl chloride, 5 to 40 mol % of isophthaloyl chloride, and 60 to 95 mol % of terephthaloyl chloride.

According to the embodiment of the present disclosure, the aromatic diamine monomer may be at least one compound selected from the group consisting of 2,2'-bis(trifluoromethyl)-4,4'-biphenyldiamine and 2,2'-dimethyl-4,4'-diaminobiphenyl.

Further, the aromatic dianhydride monomer may be at least one compound selected from the group consisting of 3,3',4,4'-biphenyltetracarboxylic acid dianhydride and cyclobutane-1,2,3,4-tetracarboxylic dianhydride.

The aromatic diamine monomer, 2,2'-bis(trifluoromethyl)-4,4'-biphenyldiamine, and an aromatic dianhydride monomer, 3,3',4,4'-biphenyltetracarboxylic acid dianhydride, can be advantageous for manifesting the above-mentioned characteristics by copolymerizing with the above aromatic dicarbonyl monomer consisting of isophthaloyl chloride and terephthaloyl chloride.

Preferably, the aromatic dianhydride monomer is contained in an amount of 25 mol % or less, 20 mol % or less, 10 mol % or less, or 5 mol % or less, based on the aromatic diamine monomer.

That is, according to the embodiment of the present disclosure, it is preferable that the content of the aromatic dicarbonyl monomer is very high and the content of the aromatic dianhydride monomer is minimized in the formation of the poly(amide-imide) copolymer, because the crystallinity of the copolymer can be lowered, and the UV weather resistance and the transmittance can be improved.

Meanwhile, the polymerization conditions for forming the polyamic acid resulting from copolymerizing the aromatic diamine monomer, the aromatic dianhydride monomer, and the aromatic dicarbonyl monomer are not particularly limited.

Preferably, the polymerization for forming the polyamic acid may be carried out by solution polymerization under an inert atmosphere at 0 to 100° C.

In the formation of the polyamic acid, a solvent such as N,N-dimethylformamide, dimethylacetamide, dimethyl sulfoxide, acetone, N-methyl-2-pyrrolidone, tetrahydrofuran, chloroform, gamma-butyrolactone, or the like may be used.

Imidization after the formation of the polyamic acid may be carried out thermally or chemically. For example, compounds such as acetic anhydride, pyridine, and the like may be used for chemical imidization.

According to the embodiment of the present disclosure, the poly(amide-imide) copolymer may have a weight average molecular weight of 10,000 to 1,000,000 g/mol, 50,000 to 1,000,000 g/mol, 50,000 to 500,000 g/mol, or 50,000 to 300,000 g/mol.

Meanwhile, the poly(amide-imide) copolymer composition includes an ultraviolet stabilizer together with the poly(amide-imide) copolymer which is an imide of a polyamic acid.

The ultraviolet stabilizer is a component capable of improving the UV shielding property and UV weather resistance of the composition.

As the ultraviolet stabilizer, compounds that are well known in the art can be applied without particular limitation.

According to the embodiment of the disclosure, the ultraviolet stabilizer may be at least one compound selected from the group consisting of a benzophenone-based ultraviolet absorber, a benzotriazole-based ultraviolet absorber, a salicylate-based ultraviolet absorber, a cyanoacrylate-based ultraviolet absorber, a nickel complex salt ultraviolet absorber, and a hindered amine-based light stabilizer (HALS).

Examples of the benzophenone-based ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole-based ultraviolet absorber include 2-(2'-hydroxy-5'-tert-octylphenyl)benzotriazole, 2-(2'-hydroxy-5'-methyl phenyl)benzotriazole, 2-(2'-hydroxy-4'-octoxyphenyl)benzotriazole, 2-(2-hydroxy-3-5-di-tert-amylphenyl)benzotriazole, 2-[2-hydroxy-3,5-di-(1,1-dimethylbenzyl)phenyl]-2H-benzotriazole, and 2-(2'-hydroxy-3'-tert-butyl-5'-methylphenyl)-5-chlorobenzotriazole.

Examples of the salicylate-based ultraviolet absorber include phenyl salicylate, p-tert-butylphenyl salicylate, and p-octylphenyl salicylate.

Examples of the cyanoacrylate-based ultraviolet absorber include ethyl-2-cyano-3,3'-diphenyl acrylate, methyl-2-cyano-3-methyl-3-(p-methoxyphenyl) acrylate, and butyl-2-cyano-3-methyl-3-(p-methoxyphenyl) acrylate.

Examples of the nickel complex salt ultraviolet absorber include nickel bis(octylphenyl) sulfide, 2,2'-thiobis(4-tert-octylphenolato)-n-butylamine nickel(II), 2,2'-thiobis(4-tert-octylphenolato)-2-ethylhexylamine nickel(II), and 2,2'-thiobis(4-tert-octylphenolato)triethanolamine nickel(II).

Examples of the hindered amine-based light stabilizer (HALS) include bis(1,2,2,6,6-pentamethyl-4-piperidyl) [[3,5-bis(1,1-dimethylethyl)-4-hydroxyphenyl]methyl]butylmalonate, bis(2,2,6,6-tetramethyl-4-piperidyl) sebacate, and poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]].

The ultraviolet stabilizer may be contained in an amount of 0.1 to 15 parts by weight based on 100 parts by weight of the imide of a polyamic acid.

Specifically, the ultraviolet stabilizer may be contained in an amount of 0.1 parts by weight or more, 0.5 parts by weight or more, 1.0 parts by weight or more, 1.5 parts by weight or more, 2.0 parts by weight or more, or 2.5 parts by weight or more, and 15.0 parts by weight or less, 10 parts by weight or less, 7.5 parts by weight or less, or 5.0 parts by weight or less, based on 100 parts by weight of the imide of a polyamic acid.

Preferably, the ultraviolet stabilizer may be contained in an amount of 0.1 to 15.0 parts by weight, 1.0 to 15.0 parts by weight, 2.0 to 10.0 parts by weight, or 2.5 to 7.5 parts by weight based on 100 parts by weight of the imide of a polyamic acid.

In order for the poly(amide-imide) copolymer composition to exhibit the desired UV shielding property and UV weather resistance, the content of the ultraviolet stabilizer is preferably 0.1 parts by weight or more based on 100 parts by weight of the imide of a polyamic acid. However, when the ultraviolet stabilizer is added in an excess amount, it may bleed out from the film including the same, thereby deteriorating the properties of the film. Therefore, the content of the ultraviolet stabilizer is preferably 15.0 parts by weight or less based on 100 parts by weight of the imide of a polyamic acid.

The poly(amide-imide) copolymer composition may exhibit excellent scratch resistance, UV shielding property, and UV weather resistance while being colorless and transparent.

Specifically, the poly(amide-imide) copolymer composition may have a rate of change ($dT/d\lambda$) of light transmittance (T) with respect to a wavelength ($\lambda$) of 2.8 to 4.0 in a light transmittance range of 10% to 80% and a wavelength range of 350 nm to 450 nm. That is, the poly(amide-imide) copolymer composition has a high slope of ultraviolet cut-off, thereby exhibiting an excellent UV shielding property.

Preferably, the poly(amide-imide) copolymer composition may have the rate of change ($dT/d\lambda$) of 2.8 or more, 2.9 or more, 3.0 or more, 3.1 or more, 3.2 or more, or 3.3 or more, and 4.0 or less, 3.9 or less, 3.8 or less, 3.7 or less, 3.6 or less, or 3.5 or less, in a light transmittance range of 10% to 80% and a wavelength range of 350 nm to 450 nm.

More preferably, the poly(amide-imide) copolymer composition may have the rate of change ($dT/d\lambda$) of 2.8 to 4.0, 2.9 to 4.0, 2.9 to 3.9, 3.0 to 3.9, 3.0 to 3.8, 3.1 to 3.8, 3.1 to 3.7, 3.2 to 3.7, 3.2 to 3.6, 3.3 to 3.6, or 3.3 to 3.5 in a light transmittance range of 10% to 80% and a wavelength range of 350 nm to 450 nm.

The poly(amide-imide) copolymer composition may have a yellow index ($YI_3$) of 5.0 or less, 4.7 to 5.0, 4.75 to 5.0, or 4.75 to 4.99, as measured in accordance with ASTM D1925 after exposure to ultraviolet light and water for 96 hours.

The difference ($\Delta YI$ value) between the yellow indexes, $YI_0$ and $YI_3$, is a measure of evaluating UV weather resistance of the poly(amide-imide) film. The poly(amide-imide) copolymer composition not only has an initial yellow index ($YI_0$) of 3.5 or less, but also has a small $\Delta YI$ value of 2.50 or less, 2.45 or less, 2.40 or less, 2.35 or less, or 1.95 to 2.35, exhibiting excellent UV weather resistance.

The poly(amide-imide) copolymer composition may have haze of 0.8% or less, 0.5% or less, 0.4% or less, 0.1 to 0.5%, 0.2 to 0.5%, or 0.2 to 0.4%, as measured in accordance with ASTM D1003 at a thickness of 50±2 μm.

In addition, the poly(amide-imide) copolymer composition may have transmittance of 88.0% or more, 88.5% or more, 88.0 to 90.0%, 88.5 to 90.0%, or 88.5 to 89.5% with respect to visible light having a wavelength of 550 nm at a thickness of 50±2 μm.

In addition, the poly(amide-imide) copolymer composition may have transmittance of 15.0% or less, 13.0% or less, 10.0% or less, 1.0 to 15.0%, or 3.0 to 15.0% with respect to ultraviolet light having a wavelength of 388 nm at a thickness of 50±2 μm.

II. Poly(amide-imide) Film

According to another embodiment of the present disclosure, a colorless and transparent poly(amide-imide) film including the poly(amide-imide) copolymer composition is provided.

As described above, as a result of studies by the present inventors, it was confirmed that a copolymer having excellent scratch resistance while being colorless and transparent can be formed, when aromatic dicarbonyl monomers having a specific composition are used to form a poly(amide-imide) copolymer using an aromatic diamine monomer, an aromatic dianhydride monomer, and an aromatic dicarbonyl monomer.

In addition, it was confirmed that the composition including the poly(amide-imide) copolymer satisfying the above characteristics and a UV stabilizer can exhibit an excellent UV shielding property and improved UV weather resistance.

As a result, the film including the poly(amide-imide) copolymer composition can be suitably used as a base material for various molded articles requiring colorless transparency as well as excellent scratch resistance, UV shielding property, and UV weather resistance. For example, this poly(amide-imide) film can be applied to substrates for displays, protective films for displays, touch panels, and the like.

The poly(amide-imide) film may be prepared by a conventional method such as a dry method or a wet method using the poly(amide-imide) copolymer. For example, the poly(amide-imide) film may be obtained by coating a solution containing the copolymer on an arbitrary support to form a film, and drying the film by evaporating the solvent from the film. If necessary, stretching and heat treatment for the poly(amide-imide) film may be carried out.

The poly(amide-imide) film may exhibit excellent scratch resistance, UV shielding property, and UV weather resistance while being colorless and transparent, because it is prepared using the poly(amide-imide) copolymer.

Specifically, the poly(amide-imide) film may have a rate of change $(dT/d\lambda)$ of light transmittance (T) with respect to a wavelength $(\lambda)$ of 2.8 to 4.0 in a light transmittance range of 10% to 80% and a wavelength range of 350 nm to 450 nm. That is, the poly(amide-imide) film has a high slope of ultraviolet cut-off, thereby exhibiting an excellent UV shielding property.

Preferably, the poly(amide-imide) film may have the rate of change $(dT/d\lambda)$ of 2.8 or more, 2.9 or more, 3.0 or more, 3.1 or more, 3.2 or more, or 3.3 or more, and 4.0 or less, 3.9 or less, 3.8 or less, 3.7 or less, 3.6 or less, or 3.5 or less, in a light transmittance range of 10% to 80% and a wavelength range of 350 nm to 450 nm.

More preferably, the poly(amide-imide) film may have the rate of change $(dT/d\lambda)$ of 2.8 to 4.0, 2.9 to 4.0, 2.9 to 3.9, 3.0 to 3.9, 3.0 to 3.8, 3.1 to 3.8, 3.1 to 3.7, 3.2 to 3.7, 3.2 to 3.6, 3.3 to 3.6, or 3.3 to 3.5 in a light transmittance range of 10% to 80% and a wavelength range of 350 nm to 450 nm.

The poly(amide-imide) film may have pencil hardness of a 2H grade or more, a 3H grade or more, or a 3H grade, as measured in accordance with ASTM D3363.

The poly(amide-imide) film may have an initial yellow index $(YI_0)$ of 3.5 or less, 3.2 or less, 3.1 or less, 3.0 or less, 2.5 to 3.5, or 2.5 to 3.0, as measured in accordance with ASTM D1925 at a thickness of 50±2 μm.

Herein, the initial yellow index $(YI_0)$ refers to a yellow index measured according to ASTM D1925 immediately after the production of the poly(amide-imide) film.

The poly(amide-imide) film may have a yellow index $(YI_3)$ of 5.0 or less, 4.7 to 5.0, 4.75 to 5.0, or 4.75 to 4.99, as measured in accordance with ASTM D1925 after exposure to ultraviolet light and water for 96 hours.

The difference ($\Delta$YI value) between the yellow indexes, $YI_0$ and $YI_3$, is a measure for evaluating UV weather resistance of the poly(amide-imide) film. The poly(amide-imide) film not has only an initial yellow index $(YI_0)$ of 3.5 or less, but also has a small $\Delta$YI value of 2.50 or less, 2.45 or less, 2.40 or less, 2.35 or less, or 1.95 to 2.35, exhibiting excellent UV weather resistance.

The poly(amide-imide) film may have haze of 0.8% or less, 0.5% or less, 0.4% or less, 0.1 to 0.5%, 0.2 to 0.5%, or 0.2 to 0.4%, as measured in accordance with ASTM D1003 at a thickness of 50±2 μm.

In addition, the poly(amide-imide) film may have transmittance of 88.0% or more, 88.5% or more, 88.0 to 90.0%, 88.5 to 90.0%, or 88.5 to 89.5% with respect to visible light having a wavelength of 550 nm at a thickness of 50±2 μm.

In addition, the poly(amide-imide) film may have transmittance of 15.0% or less, 13.0% or less, 10.0% or less, 1.0 to 15.0%, or 3.0 to 15.0% with respect to ultraviolet light having a wavelength of 388 nm at a thickness of 50±2 μm.

Advantageous Effects

The poly(amide-imide) copolymer according to the present disclosure makes it possible to provide a poly(amide-imide) film exhibiting excellent scratch resistance, UV shielding property, and UV weather resistance while being colorless and transparent.

DETAILED DESCRIPTION OF THE EMBODIMENTS

Hereinafter, preferred examples are provided for better understanding. However, these examples are for illustrative purposes only, and the invention is not intended to be limited by these examples.

Example 1

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 3.0441 g (0.00951 mol) of 2,2'-bis(trifluoromethyl)-4,4'-biphenyldiamine was added thereto to be completely dissolved. While maintaining the temperature of the solution at 25° C., 0.0839 g (0.00029 mol) of 3,3',4,4'-biphenyltetracarboxylic acid dianhydride was added thereto to be dissolved.

After the temperature of the solution was cooled down to −10° C., 0.3281 g (0.00162 mol) of isophthaloyl chloride and 1.5439 g (0.0076 mol) of terephthaloyl chloride were added thereto and stirred to obtain a polyamic acid solution having a solid content of 10 wt %.

N,N-dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 112,481 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Example 2

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 2.9569 g (0.00923 mol) of 2,2'-bis(trifluoromethyl)-4,4'-biphenyldiamine was added thereto to be completely dissolved. While maintaining the temperature of the solution at 25° C., 0.5434 g (0.00185 mol) of 3,3',4,4'-biphenyltetracarboxylic acid dianhydride was added thereto to be dissolved.

After the temperature of the solution was cooled down to −10° C., 0.1875 g (0.00092 mol) of isophthaloyl chloride and 1.3122 g (0.0064 mol) of terephthaloyl chloride were added thereto and stirred to obtain a polyamic acid solution having a solid content of 10 wt %.

N,N-dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 97,146 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Example 3

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 2.5391 g (0.01196 mol) of 2,2'-dimethyl-4,4'-diaminobiphenyl was added thereto to be completely dissolved. While maintaining the temperature of the solution at 25° C., 0.1056 g (0.00036 mol) of 3,3',4,4'-biphenyltetracarboxylic acid dianhydride was added thereto to be dissolved.

After the temperature of the solution was cooled down to −10° C., 0.4128 g (0.00203 mol) of isophthaloyl chloride and 1.9426 g (0.00957 mol) of terephthaloyl chloride were added thereto and stirred to obtain a polyamic acid solution having a solid content of 10 wt %.

N,N-dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 132,481 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Example 4

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 3.0612 g (0.00956 mol) of 2,2'-bis(trifluoromethyl)-4,4'-biphenyldiamine was added thereto to be completely dissolved. While maintaining the temperature of the solution at 25° C., 0.0562 g (0.00029 mol) of cyclobutane-1,2,3,4-tetracarboxylic dianhydride was added thereto to be dissolved.

After the temperature of the solution was cooled down to −10° C., 0.3299 g (0.00163 mol) of isophthaloyl chloride and 1.5526 g (0.00765 mol) of terephthaloyl chloride were added thereto and stirred to obtain a polyamic acid solution having a solid content of 10 wt %.

N,N-dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 122,681 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Example 5

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 1.6961 g (0.0053 mol) of 2,2'-bis(trifluoromethyl)-4,4'-biphenyldiamine and 1.1244 g (0.0053 mol) of 2,2'-dimethyl-4,4'-diaminobiphenyl were added thereto to be completely dissolved. While maintaining the temperature of the solution at 25° C., 0.0935 g (0.00032 mol) of 3,3',4,4'-biphenyltetracarboxylic acid dianhydride was added thereto to be dissolved.

After the temperature of the solution was cooled down to −10° C., 0.365 g (0.0018 mol) of isophthaloyl chloride and 1.7205 g (0.00847 mol) of terephthaloyl chloride were added thereto and stirred to obtain a polyamic acid solution having a solid content of 10 wt %.

N,N-dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 133,224 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Example 6

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 3.0547 g (0.00954 mol) of 2,2'-bis(trifluoromethyl)-4,4'-biphenyldiamine was added thereto to be completely dissolved. While maintaining the temperature of the solution at 25° C., 0.0281 g (0.0001 mol) of 3,3',4,4'-biphenyltetracarboxylic acid dianhydride was added thereto to be dissolved.

After the temperature of the solution was cooled down to −10° C., 0.368 g (0.00181 mol) of isophthaloyl chloride and 1.5493 g (0.00763 mol) of terephthaloyl chloride were added thereto and stirred to obtain a polyamic acid solution having a solid content of 10 wt %.

N,N-dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 112,481 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Comparative Example 1

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 3.0441 g (0.00951 mol) of 2,2'-bis(trifluoromethyl)-4,4'-biphenyldiamine was added thereto to be completely dissolved. While maintaining the temperature of the solution at 25° C., 0.0839 g (0.00029 mol) of 3,3',4,4'-biphenyltetracarboxylic acid dianhydride was added thereto to be dissolved.

After the temperature of the solution was cooled down to −10° C., 0.8685 g (0.00428 mol) of isophthaloyl chloride and 1.0035 g (0.00494 mol) of terephthaloyl chloride were added thereto and stirred to obtain a polyamic acid solution having a solid content of 10 wt %.

Dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 92,554 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

Comparative Example 2

A poly(amide-imide) copolymer composition having a solid content of 15 wt % was obtained in the same manner as in Comparative Example 1, except that 2-(2'-hydroxy-5'-tert-octylphenyl)benzotriazole was not added thereto.

Comparative Example 3

In a 1000 mL 4-neck round flask (reactor) equipped with a stirrer, a nitrogen injector, a dropping funnel, a temperature controller, and a condenser, 42.5 g of N,N-dimethylacetamide was placed while slowly flowing nitrogen therein, the temperature of the reactor was adjusted to 25° C., and then 2.9569 g (0.00923 mol) of 2,2'-bis(trifluoromethyl)-4,4'-biphenyldiamine was added thereto to be completely dissolved. While maintaining the temperature of the solution at 25° C., 0.05434 g (0.00185 mol) of 3,3',4,4'-biphenyltetracarboxylic acid dianhydride was added thereto to be dissolved.

After the temperature of the solution was cooled down to −10° C., 0.0562 g (0.00028 mol) of isophthaloyl chloride and 1.4435 g (0.00711 mol) of terephthaloyl chloride were added thereto and stirred to obtain a polyamic acid solution having a solid content of 10 wt %.

Dimethylacetamide was added to the polyamic acid solution to dilute the solid content to 5 wt % or less, and then the solid content was precipitated using 2 L of methanol.

The precipitated solid content was filtered and then dried at 100° C. under vacuum for 6 hours or more to obtain a poly(amide-imide) copolymer in the form of a solid (weight average molecular weight: 112,481 g/mol).

The poly(amide-imide) copolymer and 2-(2'-hydroxy-5'-tert-octylphenyl)benzotriazole (Tinuvin 329, BASF; 5 parts by weight based on 100 parts by weight of the solid content copolymer) were dissolved in N,N-dimethylacetamide to obtain a poly(amide-imide) copolymer composition having a solid content of 15 wt %.

TABLE 1

| | Poly(amide-imide) copolymer (mol %) | | | | | | UV stabilizer (parts by weight) |
|---|---|---|---|---|---|---|---|
| | TFDB | m-TBHG | BPDA | CBDA | IPC | TPC | |
| Example 1 | 50 | — | 1.5 | — | 8.5 | 40 | 5 |
| Example 2 | 50 | — | 10 | — | 5 | 35 | 5 |
| Example 3 | — | 50 | 1.5 | — | 8.5 | 40 | 5 |
| Example 4 | 50 | — | — | 1.5 | 8.5 | 40 | 5 |
| Example 5 | 25 | 25 | 1.5 | — | 8.5 | 40 | 5 |
| Example 6 | 50 | — | 0.5 | — | 9.5 | 40 | 5 |
| Comp. Ex. 1 | 50 | — | 1.5 | — | 22.5 | 26 | 5 |
| Comp. Ex. 2 | 50 | — | 1.5 | — | 22.5 | 26 | — |
| Comp. Ex. 3 | 50 | — | 10 | — | 1.5 | 38.5 | 5 |

TFDB: 2,2'-bis(trifluoromethyl)-4,4'-biphenyldiamine
m-TBHG: 2,2'-dimethyl-4,4'-diaminobiphenyl
BPDA: 3,3',4,4'-biphenyltetracarboxylic acid dianhydride
CBDA: Cyclobutane-1,2,3,4-tetracarboxylic dianhydride
IPC: Isophthaloyl chloride
TPC: Terephthaloyl chloride Example 7

The poly(amide-imide) copolymer composition obtained in Example 1 was poured onto a plastic substrate (UPILEX-75s, UBE) and the thickness of the polymer solution was uniformly controlled using a film applicator. Then, it was dried in a Mathis oven at 80° C. for 10 minutes, and cured at 250° C. for 30 minutes while flowing nitrogen therein to obtain a poly(amide-imide) film having a thickness of 50.1 μm after being peeled from the substrate.

Example 8

A film having a thickness of 50.2 μm was obtained in the same manner as in Example 7, except that the copolymer obtained in Example 2 was used in place of the copolymer obtained in Example 1.

Example 9

A film having a thickness of 49.8 μm was obtained in the same manner as in Example 7, except that the copolymer obtained in Example 3 was used in place of the copolymer obtained in Example 1.

Example 10

A film having a thickness of 52.1 μm was obtained in the same manner as in Example 7, except that the copolymer obtained in Example 4 was used in place of the copolymer obtained in Example 1.

Example 11

A film having a thickness of 50.0 μm was obtained in the same manner as in Example 7, except that the copolymer obtained in Example 5 was used in place of the copolymer obtained in Example 1.

Example 12

A film having a thickness of 50.3 μm was obtained in the same manner as in Example 7, except that the copolymer obtained in Example 6 was used in place of the copolymer obtained in Example 1.

Comparative Example 4

A film having a thickness of 49.4 μm was obtained in the same manner as in Example 7, except that the copolymer obtained in Comparative Example 1 was used in place of the copolymer obtained in Example 1.

Comparative Example 5

A film having a thickness of 49.8 μm was obtained in the same manner as in Example 7, except that the copolymer obtained in Comparative Example 2 was used in place of the copolymer obtained in Example 1.

Comparative Example 6

A film having a thickness of 50.2 μm was obtained in the same manner as in
Example 7, except that the copolymer obtained in Comparative Example 3 was used in place of the copolymer obtained in Example 1. However, the film of Comparative Example 6 was very hazy after curing, so the main properties of the experimental examples below were not evaluated.

Experimental Examples

The following characteristics were measured or evaluated for the films of the Examples 7 to 12 and Comparative Examples 4 to 6, and the results are shown in Tables 2 to 4 below.
(1) Pencil Hardness
The pencil hardness of the films was measured in accordance with ASTM D3363 using a pencil hardness Tester. Specifically, pencils of varying hardness values were fixed to the tester and scratched on the film, and then, the degree of occurrence of scratches on the film was observed with the naked eye or with a microscope. When more than 70% of the total number of scratches were not observed, a value corresponding to the hardness of the pencil was evaluated as the pencil hardness of the film.
(2) Yellow Index
The initial yellow index ($YI_0$) of the film was measured according to the method of ASTM D1925 using a UV-2600 UV-Vis Spectrometer (SHIMADZU).
(3) UV weather Resistance The yellow index ($YI_3$) of the film was measured in accordance with ASTM D1925 using a QUV Accelerated Weathering Tester (Q-LAB), after exposure of the film to ultraviolet light and water for 96 hours in accordance with ASTM G53 [Practice for Operating Light- and Water-Exposure Apparatus (Fluorescent UV-Condensation Type) for Exposure of Nonmetallic Materials].

(4) Transmittance (T)

The total light transmittance of the film was measured using a UV-VIS-NIR Spectrophotometer (SolidSpec-3700, SHIMADZU), and the transmittance with respect to visible light having a wavelength of 550 nm and the transmittance with respect to ultraviolet light having a wavelength of 388 nm are shown in the following tables.

(5) Slope of Ultraviolet Cut-Off

The rate of change ($dT/d\lambda$) of light transmittance (T, %) in a wavelength range of 350 nm to 450 nm was measured, when the total light transmittance was measured using a UV-VIS-NIR Spectrophotometer (SolidSpec-3700, SHIMADZU).

(6) Flexibility

The folding endurance of the film was evaluated using an MIT-type folding endurance tester. Specifically, a specimen (1 cm*7 cm) of the film was loaded into the folding endurance tester, and bent at a speed of 175 rpm and an angle of 135° on the left and right sides of the specimen, with a radius of curvature of 0.8 mm and a load of 250 g. Then, the number of reciprocating bends (cycles) until fracture was measured.

(7) Modulus

The Modulus (GPa) was measured according to the method of ASTM D 882 using a Universal Testing Machine (Zwick/RoellZ0.5).

(8) Coefficient of Thermal Expansion (CTE)

The coefficient of thermal expansion at 50 to 300° C. was measured according to a TMA method (temperature elevation at 10° C./min, load of 100 mN) using TMA equipment (SDTA840, manufactured by Mettler Toledo).

TABLE 2

|  | Example 7 | Example 8 | Example 9 |
|---|---|---|---|
| Pencil hardness | 3H | 3H | 3H |
| $YI_0$ | 2.68 | 3.00 | 2.89 |
| $YI_3$ | 4.78 | 4.73 | 4.99 |
| T (%) @ 388 nm | 11.8 | 3.81 | 4.51 |
| T (%) @ 550 nm | 88.8 | 88.7 | 88.8 |
| $dT/d\lambda$ | 3.5 | 3.4 | 3.4 |
| Flexibility (cycle) | 100,000 or more | 100,000 or more | 100,000 or more |
| Modulus (GPa) | 7.21 | 6.88 | 8.24 |
| CTE (ppm/° C.) | 12.1 | 13.8 | 6.7 |

TABLE 3

|  | Example 10 | Example 11 | Example 12 |
|---|---|---|---|
| Pencil hardness | 3H | 3H | 3H |
| $YI_0$ | 2.57 | 2.81 | 2.61 |
| $YI_3$ | 4.88 | 4.77 | 4.84 |
| T (%) @ 388 nm | 12.8 | 7.8 | 13.0 |
| T (%) @ 550 nm | 89.2 | 88.8 | 89.0 |
| $dT/d\lambda$ | 3.5 | 3.3 | 3.4 |
| Flexibility (cycle) | 100,000 or more | 100,000 or more | 100,000 or more |
| Modulus (GPa) | 6.48 | 7.73 | 7.31 |
| CTE (ppm/° C.) | 11.4 | 9.8 | 11.7 |

TABLE 4

|  | Comparative Example 4 | Comparative Example 5 | Comparative Example 6 |
|---|---|---|---|
| Pencil hardness | 2B | 2B | — |
| $YI_0$ | 2.58 | 2.43 | — |
| $YI_3$ | 5.38 | 12.20 | — |
| T (%) @ 388 nm | 12.4 | 67.4 | — |
| T (%) @ 550 nm | 88.9 | 89.1 | — |
| $dT/d\lambda$ | 3.0 | 2.5 | — |
| Flexibility (cycle) | 100,000 or more | 100,000 or more | 1000 or less |
| Modulus (GPa) | 5.1 | 5.1 | — |
| CTE (ppm/° C.) | 21.1 | 20.4 | — |

Referring to Tables 2 and 3, it was confirmed that all the films of Examples 7 to 12 exhibited high pencil hardness of a 3H grade, a low initial yellow index ($YI_0$) of 3.0 or less, and a small $\Delta YI(=YI_3-YI_0)$ value of 2.5 or less.

Particularly, the films of Examples 7 to 12 exhibited not only low transmittance with respect to ultraviolet light of 15% or less, but also a high slope of ultraviolet cut-off ($dT/d\lambda$) of 3.3 or more. In addition, the films of Examples 7 to 12 exhibited moduli of 6.5 GPa or more, and coefficients of thermal expansion of 15 ppm/° C. or less.

On the other hand, referring to Table 4, the films of Comparative Examples 4 and 5 exhibited low pencil hardness of a 2B grade. In addition, the films of Comparative Examples 4 and 5 exhibited a high $\Delta YI(=YI_3-YI_0)$ value of 2.8 or more, and particularly, the film of Comparative Examples 5 exhibited very poor UV weather resistance.

In addition, the films of Comparative Examples 4 and 5 exhibited lower moduli than that of the films of the examples, and coefficients of thermal expansion of 20 ppm/° C. or more.

The film of Comparative Example 6 was very hazy after curing, and the main properties of the experimental examples were not evaluated.

The invention claimed is:

1. A poly(amide-imide) film consisting essentially of:
   a poly(amide-imide) copolymer resulting from copolymerizing an aromatic diamine monomer, an aromatic dianhydride monomer, and an aromatic dicarbonyl monomer; and
   an ultraviolet stabilizer,
   wherein the aromatic dicarbonyl monomer is contained in an amount of at least 50 mol % based on the total moles of the aromatic dianhydride monomer and the aromatic dicarbonyl monomer, and
   the aromatic dicarbonyl monomer consists of 0 to 35 mol % of 4,4'-biphenyldicarbonyl chloride, 5 to 40 mol % of isophthaloyl chloride, and 60 to 95 mol % of terephthaloyl chloride, based on the total moles of the aromatic dicarbonyl monomer, and
   wherein the film at a thickness of 50±2 μm has a pencil hardness measured according to ASTM D3363 of a 2H grade or more and a modulus of 6.5 GPa or more measured according to ASTM D882.

2. The poly(amide-imide) film of claim 1, wherein a rate of change ($dT/d\lambda$) of light transmittance (T) with respect to a wavelength ($\lambda$) in a light transmittance range of 10% to 80% and in a wavelength range of 350 nm to 450 nm is 2.8 to 4.0 at a film thickness of 50±2 μm.

3. The poly(amide-imide) film of claim 1, wherein a rate of change ($dT/d\lambda$) of light transmittance (T) with respect to a wavelength ($\lambda$) in a light transmittance range of 10% to 80% and in a wavelength range of 350 nm to 450 nm is 2.9 to 3.9 at a film thickness of 50±2 μm.

4. The poly(amide-imide) film of claim 1, wherein the ultraviolet stabilizer is at least one compound selected from the group consisting of a benzophenone-based ultraviolet absorber, a benzotriazole-based ultraviolet absorber, a salicylate-based ultraviolet absorber, a cyanoacrylate-based ultraviolet absorber, a nickel complex salt ultraviolet absorber, and a hindered amine-based light stabilizer (HALS).

5. The poly(amide-imide) film of claim 1, wherein the ultraviolet stabilizer is contained in an amount of 0.1 to 15 parts by weight based on 100 parts by weight of the poly(amide-imide)copolymer.

6. The poly(amide-imide) film of claim 1, wherein the aromatic dianhydride monomer is contained in an amount of 25 mol % or less based on the aromatic diamine monomer.

7. The poly(amide-imide) film of claim 1, wherein the aromatic diamine monomer is at least one compound selected from the group of 2,2'-bis(trifluoromethyl)-4,4'-biphenyldiamine and 2,2'-dimethyl-4,4'-diaminobiphenyl.

8. The poly(amide-imide) film of claim 1, wherein the aromatic dianhydride monomer is at least one compound selected from the group of 3,3',4,4'-biphenyltetracarboxylic acid dianhydride and cyclobutane-1,2,3,4-tetracarboxylic dianhydride.

9. The poly(amide-imide) film of claim 1, wherein a rate of change $(dT/d\lambda)$ of light transmittance (T) with respect to a wavelength ($\lambda$) in a light transmittance range of 10% to 80% and in a wavelength range of 350 nm to 450 nm is 3.0 to 3.8 at a film thickness of 50±2 μm.

10. The poly(amide-imide) film of claim 1, wherein a rate of change $(dT/d\lambda)$ of light transmittance (T) with respect to a wavelength ($\lambda$) in a light transmittance range of 10% to 80% and in a wavelength range of 350 nm to 450 nm is 3.3 to 3.5 at a film thickness of 50±2 μm.

11. The poly(amide-imide) film of claim 1, wherein the film has an initial yellow index ($YI_0$) measured according to ASTM D1925 of 3.5 or less at a film thickness of 50±2 μm.

12. The poly(amide-imide) film of claim 11, wherein the film at a film thickness of 50±2 μm has a coefficient of thermal expansion of 15 ppm/° C. or less.

13. The poly(amide-imide) film of claim 1, wherein the film at a thickness of 50±2 μm has transmittance of 88.0% or more with respect to visible light having a wavelength of 550 nm, and transmittance of 15.0% or less with respect to ultraviolet light having a wavelength of 388 nm.

* * * * *